(12) United States Patent
Ash

(10) Patent No.: US 11,941,019 B2
(45) Date of Patent: Mar. 26, 2024

(54) ACCELERATED AUTOMATIC CREATION OF DATA TRANSFORMATIONS

(71) Applicant: Treasure Data, Inc., Mountain View, CA (US)

(72) Inventor: Andrew Ash, North Lawrence, OH (US)

(73) Assignee: Treasure Data, Inc., Mountain View, CA (US)

( * ) Notice: Subject to any disclaimer, the term of this patent is extended or adjusted under 35 U.S.C. 154(b) by 76 days.

(21) Appl. No.: 17/828,892

(22) Filed: May 31, 2022

(65) Prior Publication Data

US 2023/0385300 A1 Nov. 30, 2023

(51) Int. Cl.
  *G06F 16/25* (2019.01)
  *G06F 16/21* (2019.01)

(52) U.S. Cl.
  CPC ............ *G06F 16/258* (2019.01); *G06F 16/21* (2019.01); *G06F 16/254* (2019.01)

(58) Field of Classification Search
  None
  See application file for complete search history.

(56) References Cited

U.S. PATENT DOCUMENTS 7,146,399 B2 * 12/2006 Fox ............... G06F 16/288
                                            707/999.102

* cited by examiner

*Primary Examiner* — Hosain T Alam
*Assistant Examiner* — Anthony G Gemignani
(74) *Attorney, Agent, or Firm* — Baker Botts L.L.P.

(57) ABSTRACT

A computer-implemented method comprising receiving, from a user computer at a server computer, a configuration file specifying one or more data source identifiers of source database tables in a target database system, one or more data sink identifiers of sink database tables in the target database system, and two or more data transformations; the server computer initiating execution of a data transformation framework by loading one or more configuration parameters of the configuration file into main memory of the server computer to define a workflow; creating and storing a configuration table based on the configuration file, the configuration table comprising a plurality of dynamic queries, a plurality of identifiers of transformation functions, and names of the one or more data transformations; in the configuration table, for each of the transformations, creating a plurality of dynamic common table expression queries, each of the dynamic common table expression queries being associated with a particular transformation function matching one of the identifiers of the transformation functions; based on the configuration table, serially executing the dynamic common table expression queries to serially execute the one or more data transformations of the source database tables to the sink database tables.

24 Claims, 6 Drawing Sheets

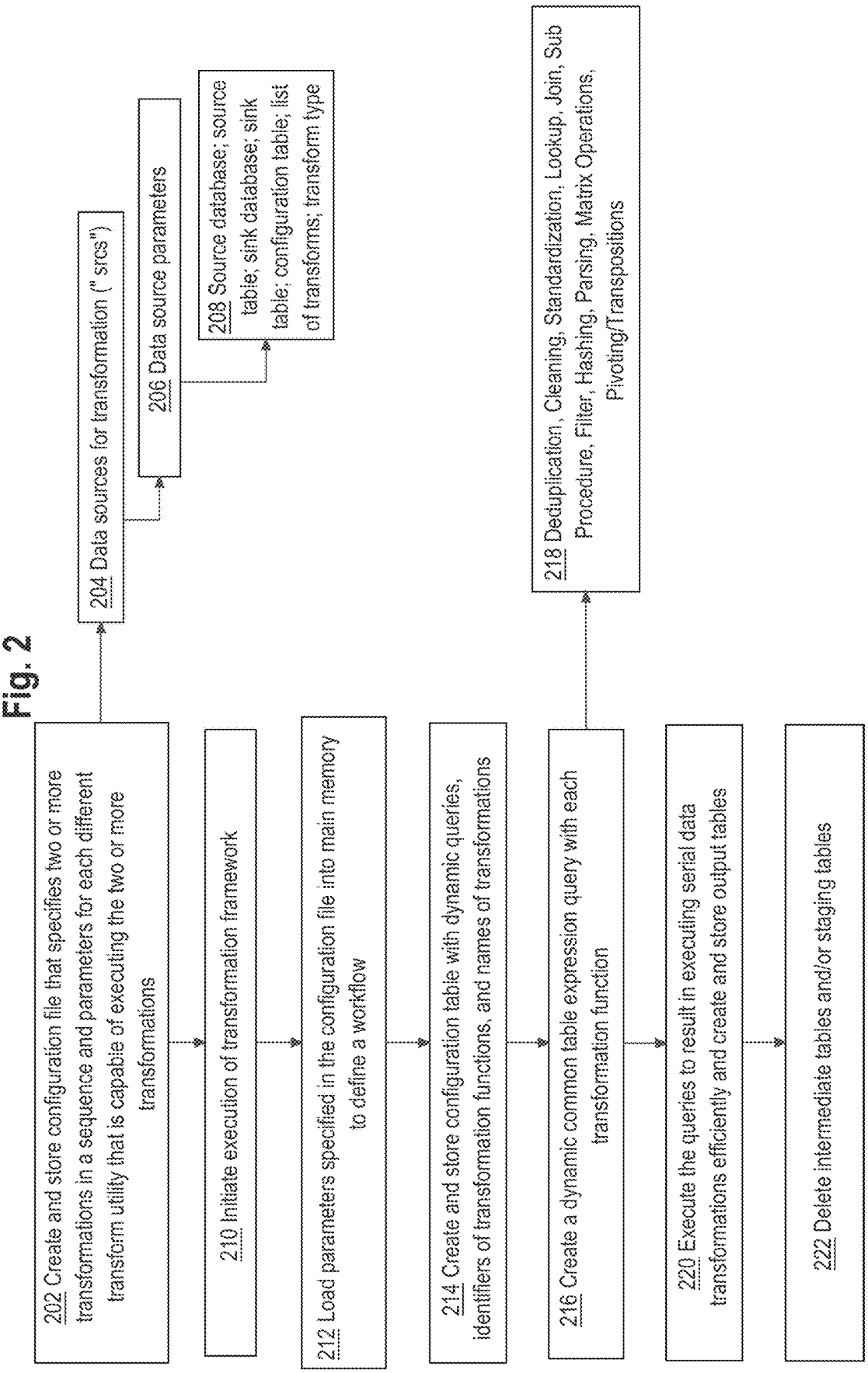

Fig. 3C

| Name ↓ | 318 |
|---|---|
| 📁 __pycache__ | |
| 📄 standardize_phone_numbers.py | |
| 📄 create_connector.py | |

| Name ↓ | 307 |
|---|---|
| 📄 states.dig | |

| Name ↓ | 324 |
|---|---|
| 📄 transform_config.yml | |
| 📄 tables.yml | |
| 📄 standardizations.yml | |
| 📄 src_params.yml | |
| 📄 sources.yml | |
| 📄 source_profile_config.yml | |
| 📄 seed_standard_sftp.yml | |
| 📄 gid_params.yml | |
| 📄 database.yml | |
| 📄 connector.yml | |

ACCELERATED AUTOMATIC CREATION OF DATA TRANSFORMATIONS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2021-2022 Treasure Data, Inc.

TECHNICAL FIELD

One technical field of the present disclosure is automated, computer-implemented transformation of large datasets in large-scale database systems. Another technical field is pipeline processing of data transforms using orchestration services.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Ingesting and transforming several data sources in large-scale databases and/or online, software-as-a-service (SaaS) platforms that use large-scale datasets can be quite cumbersome. Often, hundreds of lines of code in languages such as Structured Query Language (SQL) or Python code need to be developed to transform data to prepare it for a target application. Such code is typically prepared on a custom basis and is unreasonably time consuming. There is an acute need in the fields of data science and data pre-processing or cleaning to accelerate this process and to eliminate manual, code-based elements to streamline the data orchestration process.

SUMMARY

The appended claims may serve as a summary of the invention.

BRIEF DESCRIPTION OF THE DRAWINGS

In the drawings:

FIG. 2 illustrates a process flow or algorithm that can be programmed as part of implementing an embodiment.

FIG. 3A, FIG. 3B, FIG. 3C each illustrates a portion of a file system folder tree, and listings of configuration files, script files, and the like, that can be configured in a source code repository control system as part of implementing an embodiment.

DETAILED DESCRIPTION

Figure 1:
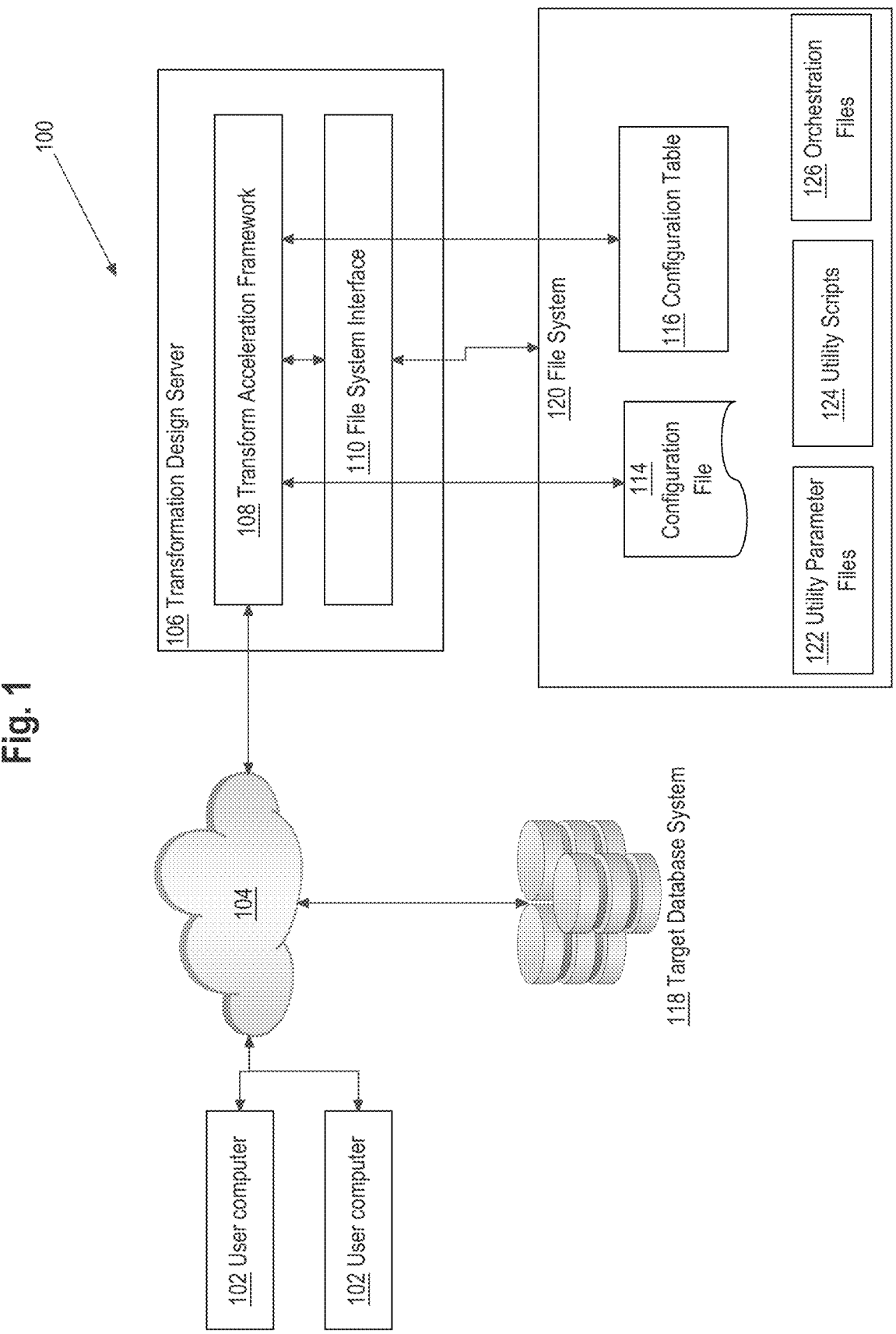
FIG. 1 illustrates a distributed computer system showing the context of use and principal functional elements with which one embodiment could be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program a computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

Embodiments are described in sections below according to the following outline:
  1. General Overview
  2. Structural & Functional Overview
    2.1 Computer System Example
    2.2 Processing Example
    2.3 Configuration File and Script Code Examples
  3. Implementation Example—Hardware Overview

1. General Overview

PRESTO is an open source distributed SQL query engine for running interactive analytic queries against data sources of all sizes ranging from gigabytes to petabytes. Presto was designed and written from the ground up for interactive analytics and approaches the speed of commercial data warehouses while scaling to the size of organizations like Facebook. Presto is commercially available at the time of this writing at the domain prestodb.io. APACHE HIVE data warehouse software facilitates reading, writing, and managing large datasets residing in distributed storage using SQL. HIVE is commercially available at the time of this writing at the internet domain hive.apache.org. DIGDAG is an open-source library for data pipeline orchestration and is commercially available from Treasure Data, Inc., Mountain View, California. Embodiments are programmed to use only PRESTO and HIVE functions, and DIGDAG code, to ensure high computing efficiency and scalability on big-data volume, which is typical for behavioral tables with one-to-many relationships. The disclosure is directed to those who understand and are experienced in using PRESTO, DIGDAG, PYTHON custom scripts, time series methods, and data analytics platforms including but not limited to customer data platforms (CDPs). A commercial example of a CDP with analytics is TREASURE INSIGHTS from Treasure Data, Inc.

In an embodiment, a configuration-based, low-code acceleration framework is programmed to facilitate commonly used utility functions and data transformations. With the disclosed framework, far less coding time is required to create functional elements that can execute for ingesting and transforming data in preparation for use with applications. Overall, the disclosed framework helps to streamline the data orchestration process in a variety of settings. The disclosed framework can help fast-track database implementations on a CDP or other processing platform by limiting end-user work to creating a configuration file that invokes functions of a packaged workflow containing several generic, configurable utilities, and parameters for those utilities. The disclosed framework integrates with orchestration services that can execute utilities in parallel for a plurality of source tables. The utilities assist data transformations from source to stage databases.

While the disclosed framework comprises a complex set of elements, they provide flexibility for the user. Once a user has set the sequence of transformations and the parameters for each transform utility, the framework can be launched. Upon initiation, the parameters are loaded into a launch workflow via an orchestration service. The parameters in each data source are read into the steps and a configuration table is created with dynamic queries, processing engines, and the name of each transformation. Once the configuration is done processing, a dynamic common table expression query is built with each respective engine to execute the series of serial data transformations in an efficient process. The process concludes with deletion of any intermediate or staging tables that were created during operation.

In various embodiments, the disclosure encompasses the following numbered clauses:

1. A computer-implemented method comprising: receiving, from a user computer at a server computer, a configuration file specifying one or more data source identifiers of source database tables in a target database system, one or more data sink identifiers of sink database tables in the target database system, and two or more data transformations; the server computer initiating execution of a data transformation framework by loading one or more configuration parameters of the configuration file into main memory of the server computer to define a workflow; creating and storing a configuration table based on the configuration file, the configuration table comprising a plurality of dynamic queries, a plurality of identifiers of transformation functions, and names of the one or more data transformations; in the configuration table, for each of the transformations, creating a plurality of dynamic common table expression queries, each of the dynamic common table expression queries being associated with a particular transformation function matching one of the identifiers of the transformation functions; based on the configuration table, serially executing the dynamic common table expression queries to serially execute the one or more data transformations of the source database tables to the sink database tables.

2. The method of clause 1, each transformation among the one or more data transformations comprising one of deduplication, cleaning, standardization, lookup, join, sub procedure, filter, hashing, parsing, matrix operations, pivoting, or transposition.

3. The method of clause 1, further comprising deleting one or more intermediate tables and/or staging tables that have been created as a result of executing the dynamic common table expression queries.

4. The method of clause 1, the configuration file specifying, for each of the two or more data transformations, a data processing engine, and a plurality of operating parameters specific to the data processing engine; the method further comprising executing the dynamic common table expression queries in part by invoking each data processing engine specified in the configuration file using the plurality of operating parameters specific to the data processing engine.

5. The method of clause 1, the configuration file specifying, for one or more of the two or more data transformations, a specification of a nested sub process prior to a join transform, each sub process specifying one or more second data source identifiers of second source database tables in the target database system, one or more second data sink identifiers of second sink database tables in the target database system, and two or more second data transformations; the method further comprising executing the dynamic common table expression queries in part by first executing the two or more second data transformations specified in the sub process followed by a join of one of the second sink tables.

6. The method of clause 5, the configuration file specifying at least one join transform that references, as a dimensional source table, one of the second sink tables of the nested sub process.

7. The method of clause 1, the plurality of dynamic common table expression queries comprising at least one HIVE query and at least one PRESTO query.

8. The method of clause 1, further comprising initiating execution of the data transformation framework by invoking a DIGDAG orchestration file that specifies including a database configuration, including a specification of source parameters, and establishes parallel execution of processing of each of the data source identifiers, the parallel execution comprising, for each of the source database tables, executing a staging query, building a plurality of transforms based on the two or more data transformations including nesting one or more sub processes, and running the plurality of transforms.

2. Structural & Functional Overview 2.1 Computer System Example

FIG. 1 illustrates a distributed computer system showing the context of use and principal functional elements with which one embodiment could be implemented. In an embodiment, a computer system 100 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1 illustrates only one of many possible arrangements of components configured to execute the programming described herein. Other arrangements may include fewer or different components, and the division of work between the components may vary depending on the arrangement.

FIG. 1, and the other drawing figures and all of the description and claims in this disclosure, are intended to present, disclose and claim a technical system and technical methods in which specially programmed computers, using a special-purpose distributed computer system design, execute functions that have not been available before to provide a practical application of computing technology to the problem of machine learning model development, validation, and deployment. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

In an embodiment, one or more user computers 102 are coupled, directly or indirectly via one or more networks 104, to a transformation design server 106 that has access to a file system 108. A target database system 118 also is communicatively coupled to the one or more networks 104. Each of the user computers 102 comprises any of a desktop computer, laptop computer, tablet computer, smartphone, or other computing device and may be coupled directly or indirectly via one or more network links. User computers 102 can be associated with end users who interact with programs of transformation design server 106 to define and launch data-driven configurations of transformations of database tables.

In an embodiment, the target database system 118 is a large-scale data repository that stores records for multiple different enterprises that have a customer relationship with the owner or operator of a CDP platform. Thus, the CDP platform can provide services to a large number of different enterprises, and all data created by the CDP platform for all enterprises can be centrally stored in the target database system 118, under the control of security algorithms that prevent user computers 102 of one enterprise from accessing, using, or viewing the data of a different enterprise. In one implementation, the target database system 118 can be an APACHE HADOOP cluster of repositories or databases. The transformation design server 106 can be coupled to, integrated with, or associated with the CDP platform in some embodiments.

In an embodiment, the network 104 can be one or more local area networks, wide area networks, or internetworks, using any of wired or wireless, terrestrial or satellite data links.

In an embodiment, the transformation design server 106 comprises sequences of executable stored program instructions that are organized in the functional units, packages, and elements shown in FIG. 1 and executed or hosted using one or more virtual computing instances in a private datacenter, public datacenter, and/or cloud computing facilities. In an embodiment, the transformation design server 106 can be programmed with instructions for a transform acceleration framework 108 and a file system interface 110. The transform acceleration framework 108 comprises processor executable instructions that are capable of performing the functions of FIG. 2 and other processes, flows, and functions as described herein in other sections.

The file system interface 110 is programmed to facilitate accessing the file system 120 and digitally stored files in the file system, such as a configuration file 114, configuration table 116, script code or other code, such as PYTHON programs, and one or more files containing queries, dictionaries, and orchestration files. The file system 120 can be integrated with the transformation design server 106, the target database system 118, or an external system, service or resource. For example, the file system 120 can comprise a third-party source code repository system such as GITHUB or BITBUCKET. When a third-party system is used, the file system interface 110 can be programmed to manage and present keys, passwords, passcodes, or other digital credentials that enable the transform acceleration framework 108 to access and use files that are stored in the file system 120.

Transformation design server 106 also can host or execute other stored program components that provide interfacing and foundation services. For example, the transformation design server 106 can host an operating system, system libraries, a web server, and web application infrastructure that enable user computers 102 to access and invoke the transform acceleration framework 108, and optionally access the file system 120, using HTTP-based browsing requests. Or, the file system 120 can expose a separate web server for independent access using HTTP-based browsing requests.

File system 120 also can host and store utility parameter files 122, utility scripts 124, and orchestration files 126, each of which is structured to support the execution of transform acceleration framework 108 by specifying queries to accomplish transformations, script code for some transformations, dictionary data such as lists of values, other internal configuration, and orchestration or workflow definitions.

The transform acceleration framework 108 comprises processor executable instructions that are capable of reading, parsing, and using a configuration file 114 to produce a configuration table 116. The transform acceleration framework 108 also is programmed to read, interpret, and execute script code or other code, such as PYTHON programs, and to read, parse, and use one or more queries, dictionaries, and orchestration files. Using these operations, the transform acceleration framework 108 is configured to access and read one or more source databases and tables of the target database system 118, execute one or more transformations of the tables, and create and store one or more sink tables in a specified sink database of the target database system.

In an embodiment, the foregoing elements are programmed, broadly, to obtain data from the target database 118; process the data according to one or more transformations that are defined in the configuration file 114 and expressed in queries in the configuration table 116, for example to normalize and/or clean the data for storage in the target database; to further process the data via data pipeline instructions according to a programmed workflow or pipeline of steps; and to create and store output in one or more sink tables of the source database, or a different target database, in the target database system 118.

The foregoing is a generalized and broad description of the operations of transformation design server 106, in one embodiment. A complete description of all possible operations and uses of transformation design server 106, independently or in conjunction with a CDP, is beyond the scope of this disclosure and would obscure the focus of this disclosure. An example of a CDP platform is the TREASURE DATA platform commercially available from Treasure Data, Inc. and Treasure Data K.K., which is fully described and documented at the time of this writing in publications available at the domain "treasuredata" in the COM global top-level domain of the World Wide Web. Those using this disclosure are presumed to have familiarity with programming, architecting, and implementing CDP platforms of the type described on the preceding publications and in creating and submitting data transformations using pipeline processors or orchestration systems. The ability to create a working implementation based on this disclosure may also involve having knowledge and skill with PRESTO, HIVE, DIGDAG from Treasure Data, and TREASURE INSIGHTS from Treasure Data.

2.2 Processing Example

FIG. 2 and each other flow diagram herein is intended as an illustration at the functional level at which skilled persons, in the art to which this disclosure pertains, communicate with one another to describe and implement algorithms using programming. The flow diagrams are not intended to illustrate every instruction, method object or sub-step that would be needed to program every aspect of a working program, but are provided at the same functional level of illustration that is normally used at the high level of skill in this art to communicate the basis of developing working programs. Furthermore, the process of FIG. 2 should be implemented with reference to all other programming details and example files that are provided in other sections herein. In one embodiment, DIGDAG orchestration configuration files define the overall process flow of FIG. 2 and can be invoked to start the process.

At block 202, the process of FIG. 2 is programmed to create and store a configuration file that specifies two or more transformations in a sequence and parameters for each different transform utility that is capable of executing the two or more transformations. The result of block 202 is creating and storing the configuration file 114. In some embodiments, configuration file 114 is expressed in Yet Another Markup Language (YAML) format.

At block 210, the process is programmed to initiate execution of a transformation framework. For example, user computer 102 can access a web server at the transformation design server 106 to obtain access to and invoke the transform acceleration framework 108 with a reference to the configuration file 114. In response, the transform acceleration framework 108 can initiate execution, read the configuration file 114, and perform the other functions described herein.

At block 212 the process is programmed to load parameters specified in the configuration file into main memory to define a workflow. For example, upon initiation, YAML parameters are loaded into the launch workflow. At block 214 the process is programmed to create and store configuration table with dynamic queries, identifiers of transformation functions, and names of transformations. The parameters in each data source are read into the steps and a configuration table is created with dynamic queries, engines, and the name of each transformation. For example, configuration table 116 is created. TABLE 1 illustrates an example of the resulting contents of a configuration table.

At block 216 the process is programmed to create a dynamic common table expression query with each transformation function. Each query can be stored in the configuration table 116 in association with a corresponding transformation function. Thus, once the configuration is done processing, a dynamic common table expression(s) query is built with each respective engine to execute the series of serial data transformations in an efficient process. As indicated by block 218, in one embodiment, queries for deduplication, cleaning, standardization, lookup, join, sub procedure, filter, hashing, parsing, matrix operations, and pivoting/transpositions can be supported. Other embodiments can support fewer or more such operations. TABLE 2, TABLE 3, and TABLE 4 show examples of possible queries using PRESTO and HIVE, in various embodiments.

TABLE 2

Common Table Expression Query Example - PRESTO

DROP TABLE IF EXISTS td_stg_qa.customers_intrmdt_tmp;
CREATE TABLE td_stg_qa.customers_intrmdt_tmp AS WITH
customers_1 AS  (SELECT
*
FROM
td_src_qa.customers),
customers_2 AS  (SELECT gender AS gender,
last_name AS last_name,
id AS id,
ip_address AS ip_address,
first_name AS first_name,
email AS email,
time AS time
FROM (
    SELECT gender AS gender,
last_name AS last_name,
id AS id,
ip_address AS ip_address,

TABLE 1

Configuration Table Example

| Time | Transform | Engine | Src | Fields | Process |
|---|---|---|---|---|---|
| 1643832630 | SELECT to_hex(sha256 (CAST(first_n . . . | presto | customers | first_name, last_name, rnk, email, gender . . . | hash |
| 1643832596 | SELECT time AS time, | presto | customers | time, l_stock, name, rnk, last_name, gender . . . | filter |
| 1643832571 | SELECT | hive | customers | time, l_stock, name, rnk, last_name, gender . . . | join |
| 1643832560 | SELECT | presto | customers | id, gender_code, email, last_name, industry . . . | join |
| 1643832524 | SELECT lower(stock) AS l_stock, | presto | stocks_1 | l_stock, time, cap, price, industry, id,. | clean |
| 1643832489 | SELECT | null | stocks_1 | cap, price, industry, id, customer_id, stock . . . | stage |
| 1643832459 | SELECT customers.first_name AS first . . . | presto | customers | first_name, last_name, ip_address, name . . . | lookup |
| 1643832436 | SELECT customers.first_name AS first_name | hive | customers | first_name, last_name, ip_address, name . . . | clean |
| 1643832423 | SELECT lower(last_name) AS last_name | presto | customers | last_name, first_name, ip_address, name . . . | lookup |
| 1643832398 | SELECT gender AS gender | presto | customers | gender, last_name, id, ip_address, first_name . . . | dedup |
| 1643832377 | SELECT | NULL | Customers | Gender, last_name, id, ip_address, first_name . . . | stage |

TABLE 2-continued

Common Table Expression Query Example - PRESTO

```
first_name AS first_name,
email AS email,
time AS time ,ROW_NUMBER( ) OVER (
      PARTITION BY id ORDER BY time desc
      ) rn
   FROM customers_1
   ) a
WHERE rn = 1),
customers_3 AS   (SELECT lower(first_name) AS first_name,
lower(last_name) AS last_name,
case when gender = 'Female' then 'F' else 'M' END AS gender_code,
id AS id,
row_number( ) over (partition by email order by time) AS rnk,
lower(gender) AS gender,
email AS email,
time AS time,
ip_address AS ip_address,
concat(first_name,' ',last_name) AS name
FROM
   customers_2),
customers_4 AS   (SELECT customers.first_name AS first_name,
customers.last_name AS last_name,
customers.gender_code AS gender_code,
customers.id AS id,
customers.rnk AS rnk,
customers.gender AS gender,
customers.email AS email,
customers.time AS time,
customers.ip_address AS ip_address,
customers.name AS name,
   x.industry AS industry
FROM
   customers_3 customers
LEFT
   JOIN
   stocks x
ON customers.id = x.customer_id),
stocks_l_1 AS   (SELECT
   *
FROM
td_src_qa.stocks),
sub_stocks_l AS   (SELECT industry AS industry,
customer_id AS customer_id,
id AS id,
stock AS stock,
lower(stock) AS l_stock,
time AS time,
cap AS cap,
price AS price
```

TABLE 2-continued

Common Table Expression Query Example - PRESTO

```
FROM
   stocks_l_1),
sub_customers AS   (SELECT
customers_4.email AS email,
customers_4.first_name AS first_name,
customers_4.time AS time,
customers_4.gender AS gender,
sub_stocks_l.customer_id AS customer_id,
customers_4.id AS id,
customers_4.gender_code AS gender_code,
customers_4.ip_address AS ip_address,
customers_4.industry AS industry,
customers_4.name AS name,
customers_4.rnk AS rnk,
customers_4.last_name AS last_name,
sub_stocks_l.l_stock AS l_stock
FROM customers_4 customers_4
inner join sub_stocks_l sub_stocks_l ON customers_4.id =
sub_stocks_l.id and customers_4.email != 'cshalloer@hud.gov')
select * from sub_customers
```

TABLE 3

Common Table Expression Query Example-HIVE

```
WITH
sub_customers AS (SELECT
customers_intrmdt.rnk AS rnk,
customers_intrmdt.name AS name,
customers_intrmdt.l_stock AS l_stock,
users.first_name AS first_name,
customers_intrmdt.gender AS gender,
customers_intrmdt.time AS time,
customers_intrmdt.id AS id,
customers_intrmdt.gender_code AS gender_code,
customers_intrmdt.ip_address AS ip_address,
customers_intrmdt.industry AS industry,
users.last_name AS last_name,
customers_intrmdt.customer_id AS customer_id,
customers_intrmdt.email AS email
FROM customers_intrmdt customers_intrmdt
left join td_src_qa.users users ON customers_intrmdt.id = users.id
)
INSERT OVERWRITE TABLE td_stg_qa.customers_intrmdt_tmp
select * from sub_customers
```

TABLE 4

Common Table Expression Query Example-PRESTO

```
DROP TABLE IF EXISTS td_stg_qa.customers_intrmdt_tmp; CREATE TABLE
td_stg_qa.customers_intrmdt_tmp AS WITH
customers_1 AS (SELECT rnk AS rnk,
name AS name,
l_stock AS l_stock,
first_name AS first_name,
gender AS gender,
time AS time,
id AS id,
gender_code AS gender_code,
ip_address AS ip_address,
industry AS industry,
last_name AS last_name,
customer_id AS customer_id,
email AS email
FROM customers_intrmdt
where (gender_code = 'M' and email like '%.edu%') and
(last_name like '%s%') ),
sub_customers AS (SELECT to_hex(sha256(CAST(first_name as VARBINARY))) AS
first_name,
to_hex(sha256(CAST(last_name as VARBINARY))) AS last_name,
rnk AS rnk,
```

TABLE 4-continued

Common Table Expression Query Example-PRESTO

```
l_stock AS l_stock,
name AS name,
gender_code AS gender_code,
to_hex(sha256(CAST(email as VARBINARY))) AS email,
id AS id,
ip_address AS ip_address,
gender AS gender,
customer_id AS customer_id,
time AS time,
industry AS industry
FROM
    customers_1)
select * from sub_customers
```

At block 220 the process is programmed to execute the queries to result in executing serial data transformations efficiently and create and store output tables. In an embodiment, the transform acceleration framework 108 is programmed to read the configuration table 116 row-by-row and execute each query that was previously stored. The result of executing the queries is to create and store one or more sink tables in the target database system 118 that contain the results of transformations that were specified in the configuration table. In some cases, queries may cause creating and storing one or more intermediate tables and/or staging tables. At block 222 the process is programmed to delete the intermediate tables and/or staging tables at the end of processing the configuration table 116.

In this manner, the disclosure can fast-track the implementation of data transforms on a CDP or other platform by leveraging a packaged workflow containing several generic, configurable utilities. The transform acceleration framework 108 is programmed to execute the utilities in a scalable way by incorporating a YAML configuration file and leveraging DIGDAG concurrently. The utilities are designed to assist data transformations from source to stage databases. Using the transform acceleration framework 108 as described can speed-up the implementation process by executing a series of common, generic data transformations. Thus, it lends itself well to promoting data from source to stage.

TABLE 10 below is an example of a configuration file 114 in YAML format. In a "srcs" section, configuration file 114 can specify a list of data sources to transform. A data source operates as a fact table to over which field and table level transformations execute. The user computer 102 can add a '-data:' list element and configure the source parameters for the fact table and the transformations.

The configuration file 114 also specifies a list of transforms to run over the fact table, in the order in which they will run. Transforms are specified in terms of type, such as full on incremental. With incremental transforms, deduplication normally executes last and runs only on the incremental data, which is stored in an intermediate table; a reconciliation step executes a union of the incremental data with previous data, runs a deduplication on the union and promotes the data to production. A time field can be specified to cause retrieving only the newest addition of data when staging data from source to production before the transforms run on the data.

In an embodiment, transform acceleration framework 108 incorporates a sub process to run transformations before joining the resulting data to the fact table. In an embodiment, a sub process is a duplicate of a first process that is nested to run on another source table that later will be used in a table join operation. For example, a data source section of the configuration table can serve as the name of a common table expression in a query to use in a join. Another sub process can be further nested within the sub process if needed. Each sub process normally is positioned before the join utility within the transforms list in the data source section of the configuration file. An example of a properly ordered transform list is [clean, sub, join, dedup].

2.3 Configuration File and Script Code Examples

Figure 3A:
Figure 3B:

Referring again to FIG. 1, as introduced above, utility parameter files 122, utility scripts 124, and orchestration files 126 can support the execution of transform acceleration framework 108 by specifying queries to accomplish transformations, script code for some transformations, dictionary data such as lists of values, other internal configuration, and orchestration or workflow definitions. FIG. 3A, FIG. 3B, FIG. 3C each illustrates a portion of a file system folder tree, and listings of configuration files, script files, and the like, that can be configured in a source code repository control system as part of implementing an embodiment. FIG. 3A illustrates an example folder hierarchy that can be used to store supporting files for one embodiment, in this case, using the GITHUB repository system. In the example of FIG. 3A, a root folder 302 can comprise a plurality of DIGDAG orchestration files having names such as launch.dig, ingest.dig, and so forth. TABLE 5, TABLE 6, TABLE 7 illustrate example workflows using DIGDAG orchestration.

TABLE 5 transform_wf.dig Example

```
timezone: UTC
_export:
    !include : 'config/database.yml'
    !include : 'config/transform_config.yml'
    columns_concat: ""
+transform_process:
    +loop_over_table_list:
        for_each>:
            transform_obj: ${transform}
        _do:
            +create_table:
                td_ddl>:
                create_tables: ["${transform_obj.to_tbl}"]
                database: ${transform_obj.to_db}
```

TABLE 5-continued transform_wf.dig Example

```
+transform:
  _export:
    source_db: ${transform_obj.from_db}
    source_tbl: ${transform_obj.from_tbl}
  +get_columns:
    td>: queries/general/get_column_names.sql
    database: ${transform_obj.from_db}
    store_last_results: true
  +insert:
    td>: queries/transform/transform.sql
    database: ${transform_obj.to_db}
    insert_into: ${transform_obj.to_tbl}
```

TABLE 6 quickstart_wf.dig Example

```
timezone: UTC
_export:
  db_info:
    !include : 'config/database.yml'
  tbl_info:
    !include : 'config/tables.yml'
  src_info:
    !include : 'config/sources.yml'
  std_info:
    !include : 'config/standardizations.yml'
  connector:
    !include : 'config/connector.yml'
+step1:
  #echo>: ${db_info.client_short_name}${db_info.db_postfix}
  _parallel: true
  +src:
    td_ddl>:
    create_databases: ["${db_info.client_short_name}_${db_info.src}_${db_info.env}"]
    database: "${db_info.client_short_name}_${db_info.src}_${db_info.env}"
  +stg:
    td_ddl>:
    create_databases: ["${db_info.client_short_name}_${db_info.stg}_${db_info.env}"]
    database: "${db_info.client_short_name}_${db_info.src}_${db_info.env}"
  +gld:
    td_ddl>:
    create_databases: ["${db_info.client_short_name}_${db_info.gld}_${db_info.env}"]
    database: "${db_info.client_short_name}_${db_info.src}_${db_info.env}"
+step2:
  +if_ui_connector:
    if>: ${connector.ui_connector == true}
    _do:
      for_each>:
        source: ${src_info.sources}
      _do:
        echo>: ${source}
        #td_load>: ${source.source_id}
        #database: "${db_info.client_short_name}${db_info.db_postfix}${env}"
  +generate_yamls:
    _env:
      connector_list: ${tbl_info.src_details}
      seed_file: "/config/seed_standard_sftp.yml"
      database: "${db_info.client_short_name}${db_info.src}_${db_info.env}"
    py>: python.create_connector.main
    docker:
      image: "digdag/digdag-python:3.7"
  +data_profiling:
    call>: data_profiling
#+step2:
#  td_ddl>:
#  create_tables: ${tbl_info.tbl_names}
#  database: "${db_info.client_short_name}${db_info.db_postfix}${env}"
#+step3:
#  for_each>:
source: ${src_info.sources}
_do:
#    #echo>: ${source}
```

TABLE 6-continued quickstart_wf.dig Example

```
#     td_load>: ${source.source_id}
#     database: "${db_info.client_short_name}${db_info.db_postfix}${env}"
#+step4:
#    td_ddl>:
#          create_databases: ["${db_info.client_short_name}${db_info.db_postfix}_stg"]
#    database: "${db_info.client_short_name}${db_info.db_postfix}_stg"
#+step5:
#    _parallel: true
#    _export:
#          source_database: "${db_info.client_short_name}${db_info.db_postfix}${env}"
#          destination_database: "${db_info.client_short_name}${db_info.db_postfix}_stg"
#    for_each>:
table: ${tbl_info.tbl_names}
_do:
      #echo>: ${table}
#       +COPY_TBL:
engine: presto
td>: 'queries/copy.sql'
database: ${destination_database}
#+step6:
#    _parallel: true
#    for_each>:
#       table_col: ${std_info.us_phone_number}
#    _do:
#       td_for_each>: queries/usphone.sql
#       database: "${db_info.client_short_name}${db_info.db_postfix}_stg"
#       _do:
#          +standardize_us_phone_number:
             #echo>: found a user ${td.each.phone} email ${td.each.email}
#             _export:
                #pn: td.each.${table_col.col}
             #echo>: found a user ${pn}
#             phone_number: ${td.each.phone}
             #echo>: phone ${td.each}
#             py>: python.standardize_phone_numbers.standardize_us_phone_number
             #${td.each.phone}: ${formatted_pn}
#          +loop_td_each:
#             for_each>:
#               key: ${td.each}
#             _do:
#               echo>: formatted number is ${key}
#+step7:
#    +step7a:
#       td_ddl>:
#          create_databases: ["${db_info.client_short_name}${db_info.db_postfix}_prd"]
#       database: "${db_info.client_short_name}${db_info.db_postfix}_prd"
#    +step7b:
#       _export:
#          source_database: "${db_info.client_short_name}${db_info.db_postfix}_stg"
#          destination_database: "${db_info.client_short_name}${db_info.db_postfix}_prd"
#       for_each>:
table: ${tbl_info.tbl_names}
_do:
#          echo>: ${table}
#          +COPY_TBL:
engine: presto
td>: 'queries/copy.sql'
database: ${destination_database}
```

TABLE 7 ingest.dig Example

```
timezone: UTC
_export:
   !include : 'config/database.yml'
   !include : 'config/sources.yml'
+data_ingestion:
   +run_parallel:
      _parallel: true
      +load_data:
         for_each>:
            list: ${sources}
         _parallel: true
         _do:
```

TABLE 7-continued ingest.dig Example

```
+load:
    td_load>: ${list.source_id}
    database: ${list.src_db}
+data_ingestion_log:
    records: ${td.last_job.num_records}
    td>: queries/log/data_ingestion_log.sql
    database: reporting
```

Referring again to FIG. 3A, a queries folder 304 can have the contents shown in block 306 and can comprise a transform query sub folder, log query sub folder, golden query sub folder, general query sub folder, and data profiling query sub folder. The queries folder 304 also can hold query files such as usphone.sql and copy.sql, examples of which are specified below.

A PYTHON folder can hold script code for implementing certain transforms. A dictionaries folder 307 can contain one or more DIGDAG expressions that contain dictionary metadata. An example is a list of the names of the states of the United States. A configuration folder can hold general configuration files that govern the operation of the transform acceleration framework 108.

FIG. 3B shows example sub folder contents of the queries folder 304. Sub folders 308, 310, 312, 314, 316 can store query files for transform queries, log queries, golden queries, general queries, and data profiling queries. TABLE 8 illustrates example queries that can be stored in sub folder 308, 310, 312, 314, 316, in various embodiments.

TABLE 8

SQL Examples

```
transform.sql:
SELECT ${td.last_results.columns}
FROM ${source_db}.${source_tbl}
data_ingestion_log.sql:
INSERT into ${list.log_tbl}
select '${list.source_id}' source_id,
    '${list.src_db}' database_name,
    '${list.src_tbl}' table_name,
    ${records} records,
    (select count(*) cols
    FROM INFORMATION_SCHEMA.COLUMNS
    where table_schema = '${list.src_db}'
    and table_name = '${list.src_tbl}') columns
summary.sql:
INSERT INTO ${gld_db}.${dest_tbl}
SELECT *
FROM ${stg_db}.${src_tbl}
get_column_names.sql:
SELECT array_join(array_agg (column_name), CONCAT (
                        ','
                        ,chr(10)
                        )) AS "columns"
FROM (
    SELECT CASE
        WHEN data_type = 'varchar' THEN
CONCAT ('LOWER(TRIM(',column_name,')) AS ', column_name)
        ELSE column_name
        END AS column_name
    FROM information_schema.COLUMNS
    WHERE table_name = '${source_tbl}'
        AND table_schema = '${source_db}'
    ) x
-- SELECT array_join(array_agg(CONCAT('LOWER(TRIM(CAST(',column_name,' AS
VARCHAR))) AS ',column_name)), CONCAT (
--                      ','
--                      ,chr(10)
--                      )) AS "columns"
-- FROM (
--   SELECT column_name
--   FROM information_schema.COLUMNS
--   WHERE table_name = '${source_tbl}'
--     AND table_schema = '${source_db}'
--   ) x
dataprofiler.varchar.valuefreq.sql:
with valfreq as (select
'${source_database}.${source_table}' as schema
,'${column}' as col_name
,${column} as col_value
,count(${column}) as val_freq from ${source_database}.${source_table}
group by 1,2,3
order by 1,2,3 desc
limit ${val_freq_limit} )
select *
from valfreq
```

FIG. 3C illustrates example sub folders and file contents for a PYTHON sub folder 318 of the root folder 302 (FIG. 3A), dictionaries sub folder 307, and config sub folder 324. TABLE 9 shows example PYTHON code that could be stored in files in the PYTHON sub folder 318. TABLE 10 shows an example complete configuration file with comments in YAML format, and examples of the YAML files transform_config.yml, standarizations.yml, sources.yml, source_profile_config.yml, seed_standard_sftp.yml, gld_params.yml, database.yml that could be in the config sub folder 324.

TABLE 9

PYTHON Code Examples

```
standardize_phone_numbers.py:
import phonenumbers
import digdag
def standardize_us_phone_number(phone_number='3127580371'):
    parsed_pn = phonenumbers.parse(phone_number, "US")
    if phonenumbers.is_valid_number(parsed_pn):
        formatted_pn = phonenumbers.format_number(parsed_pn,
            phonenumbers.PhoneNumberFormat.NATIONAL)
    digdag.env.store({"formatted_pn":formatted_pn})
if _name_ == '_main_':
    standardize_us_phone_number(phone_number='1112224444')
create_connector.py
# from stat import S_ISDIR, S_ISREG
# from config_sftp import database_name, \
#   is_data_load_initially, \
#   cron, seed_file, sftpHostname, \
#   sftpUsername, sftpPassword, key
    # table_name, remotedir, sftp_folder_name
import subprocess
import os
import json
import sys
os.system(f'{sys.executable} -m pip install pyyaml")
# import pysftp
import yaml
import re
# table_name = str(sys.argv[1])
def file_cleanup(directory):
    """
    Clean up the yml files ending with .yml.*
    :param directory:
    :return: Nothing
    """
    try:
        pattern = r'\.yml\.[0-9]$'
        for filename in os.listdir(directory):
            if re.search(pattern, filename):
                os.remove(os.path.join(directory, filename))
                # print('File removed: ', filename)
            else:
                continue
    except Exception as e:
        print('Something went wrong in file_cleanup', str(e))
def _sftp_helper(sftp, files):
    """
    Create the List of files available on sftp
    :param sftp:
    :param files :
    :return: Nothing
    """
    stats = sftp.listdir_attr('.')
    files[sftp.getcwd( )] = [attr.filename for attr in stats if
S_ISREG(attr.st_mode)]
    for attr in stats:
        if S_ISDIR(attr.st_mode): # If the file is a directory, recurse it
            sftp.chdir(attr.filename)
            _sftp_helper(sftp, files)
            sftp.chdir('..')
def filelist_recursive(sftp):
    """
    Returning the list of files
    :param sftp:
    :return:
    """
    files = { }
    _sftp_helper(sftp, files)
    return files
```

TABLE 9-continued

PYTHON Code Examples

```
def create_seed_yml(seed_file, db_name, table_name, path_prefix,
path_match_pattern, mode,
            file_type, delimiter, quote, column_header, columns,
directory):
    """
    Create the seed file
    :param seed_file:
    :param db_name:
    :param table_name:
    :return: seed file name
    """
    with open(seed_file, 'r') as file:
        # The FullLoader parameter handles the conversion from YAML
        # scalar values to Python the dictionary format
        yml_file = yaml.load(file, Loader=yaml.FullLoader)
        yml_file['in']['path_prefix'] = path_prefix
        yml_file['in']['path_match_pattern'] = path_match_pattern
        yml_file['in']['parser']['type'] = file_type
        yml_file['in']['parser']['delimiter'] = delimiter
        yml_file['in']['parser']['quote'] = quote
        yml_file['out']['database'] = db_name
        yml_file['out']['table'] = table_name
        yml_file['out']['mode'] = mode
        if column_header == "false":
            yml_file['in']['parser']['columns'] = columns
            yml_file['in']['parser']['skip_header_lines'] = 0
        else:
            yml_file['in']['parser']['skip_header_lines'] = 1
    # actual_seed_filename = (path_prefix.split('/') [-
1].split('.')[0]).replace(' ', '_')
    file_new = directory + '/seed_' + table_name + '.yml'
    file_new = r"{ }".format(file_new)
    with open(file_new, 'w') as f:
        yaml.dump(yml_file, f, default_flow_style=False)
    print(f'file{file_new} is created successfully.')
    return file_new
def convert_all_cols_to_string(guessed_file):
    """
    Convert all non string columns to string
    :param guessed_file:
    :return: updated 'load1_' File name
    """
    new_column_list = [ ]
    with open(guessed_file, 'r') as file:
        # The FullLoader parameter handles the conversion from YAML
        # scalar values to Python the dictionary format
        yml_file = yaml.load(file, Loader=yaml.FullLoader)
        # print(yml_file)
        col_list = yml_file.get('in').get('parser').get('columns')
        # print(col_list)
        for elements in col_list:
            # print(elements)
            if elements.get('type') != 'string':
                # if elements.get('format'):
                #    del elements ['format']
                elements['type'] = 'string'
            # print(elements)
            new_column_list.append(elements)
        # print(new_column_list)
        yml_file['in']['parser' ]['columns'] = new_column_list
        # print(yml_file)
    file_new = guessed_file.replace('load_', 'load1_')
    file_new = r"{ }".format(file_new)
    with open(file_new, 'w') as f:
        yaml.dump(yml_file, f, default_flow_style=False)
    print(f'file {file_new} is created successfully.')
    return file_new
def run_td_command(cmd, cmd_type):
    """
    Run the TD command provided and capture the error if found any
    :param cmd:
    :param cmd_type:
    :return: Nothing
```

TABLE 9-continued

PYTHON Code Examples

```
"""
    print(f'Running command: {cmd}')
    try:
        error_msg_local = { }
        results = subprocess.run(
            cmd, shell=True, universal_newlines=True,
stdout=subprocess.PIPE, stderr=subprocess.PIPE)
        returncode = results.returncode
        print('returncode: ', returncode)
        if returncode != 0:
            error_msg_local[cmd_type] = {'failed_command': cmd,
'returncode': returncode,
                                         'error msg' : results.stderr +
results.stdout}
            # print(error_msg_local)
            # import multiple errors as list for same cmd_type if any
            try:
                for key, val in error_msg_local.items( ):
                    error_msg[key].append(val)
            except KeyError:
                error_msg[key] = [val]
        else:
            pass
            # print(f'Command "{cmd}" ran successfully')
    except subprocess.CalledProcessError as e:
        print(str(e))
    except Exception as e:
        print('Something Went Wrong...', str(e))
# Code Starts From Here
# TD Connector Commands
td_guess_cmd = 'td connector:guess {seed_file} -o {guessed_file}'
td_cc_cmd = 'td -k {key} connector:create {name} {cron} {database} {table}
{config}'
td_create_table_cmd = 'td -k {key} table:create {database} {table}'
error_msg = { }
# PLACE HOLDER FOR ADDING CODE TO HANDLE THE ENCRYTION STUFF
def main(seed_file = os.environ['seed_file'],
         connector_list = os.environ['connector_list'],
         database_name = os.environ['database']
         ):
    print(seed_file)
    connector_list = json.loads(connector_list)
    print(connector_list, type(connector_list))
    if not os.path.exists('yml_files'):
        os.mkdir('yml_files')
    cwd = os.getcwd( )
    print("Path: "+str(cwd))
    directory = os.path.join(cwd, 'yml_files')
    try:
        #with pysftp.Connection(host=sftpHostname, username=sftpUsername,
password=sftpPassword) as sftp:
        for item in connector_list:
            print("!!!!!!!!!!", item, type(item))
            # connector_dict = json.loads(item)
            seed_file = create_seed_yml(seed_file=seed_file,
                                        db_name=database_name,
                                        table_name=item['tbl'],
                                        path_prefix=item['path'],
path_match_pattern=item['path_match_pattern'],
                                        mode=item['mode'],
                                        file_type=item['file_type'] ,
                                        delimiter=item['delimiter'],
                                        quote=item['quote'],
column_header=item['column_header'],
                                        columns=item['columns'],
                                        directory
                                        )
            guessed_file = seed_file.replace('seed', 'load')
            td_guess_cmd_1 = td_guess_cmd.format(seed_file=seed_file,
                                                guessed_file=guessed_file
                                                )
            # print(td_guess_cmd_1)
            # run the guess command
            run_td_command(td_guess_cmd_1, item['tbl'])
            # convert all column data type to sting
            updated_guessed_filename =
```

TABLE 9-continued

PYTHON Code Examples

```
convert_all_cols_to_string(guessed_file)
        # Creating the table which is used in connector
        # create_tbl_cmd = td_create_table_cmd.format(key=key,
database=database_name,
        #                                         table=table_name
        #                                         )
        # # print('create_tbl_cmd: ', create_tbl_cmd)
        # # run the create_tbl_cmd command
        # run_td_command(create_tbl_cmd, table_name)
        #
        # # Call function to create the connector
        # connector_name = 'dev_' + table_name
        # print('connector_name: ', connector_name)
        # td_cc_cmd_1 = td_cc_cmd.format(key=key,
        #                                name=connector_name,
        #                                cron=cron ,
        #                                database=database_name,
        #                                table=table_name,
        #
config=updated_guessed_filename
        #                                )
        # # print(td_cc_cmd_1)
        #
        # # run the create cconnector command
        # run_td_command(td_cc_cmd_1, table_name)
        # # print(f'Connector {connector_name} created
successfully...')
        #
        # if is_data_load_initially:
        #    run_connector_command = f'td -k {key} connector:run
{connector_name}'
        #    # run the create_tbl_cmd command
        #    run_td_command(run_connector_command, table_name)
        #    print(f'Table {table_name} is loaded successfully.')
    except Exception as e:
        print('Something Went Wrong... Please check.', str(e))
        raise
    finally:
        if error_msg:
            print('\n\nBelow are list of commands which fails...')
            print(error_msg)
    print('#' * 80, '\n')
    # File cleanup
    file_cleanup(directory)
    if not error_msg:
        print('Yay!!! Connectors created successfully... Please check
UI.')
if _name_ == '_main_':
    # call main method
    print('In Main')
    main(seed_file)
```

TABLE 10

Configuration YAML Examples

```
transform_config.yml:
transform:
  - from_db: ${client_short_name}_${src}_${env}
    from_tbl: customers
    to_db: ${client_short_name}_${stg}_${env}
    to_tbl: customers
    columns:
      - column_name: first_name
        query_functions: UPPER(TRIM(first_name))
      - column_name: last_name
        query_functions: UPPER(TRIM(last_name))
      - column_name: id
        query_functions: TRIM(id)
      - column_name: ip_address
        query_functions: TRIM(ip_address)
      - column_name: gender
        query_functions: SUBSTR(TRIM(gender),1,1)
      - column_name: email
        query_functions: LOWER(TRIM(email))
```

TABLE 10-continued

Configuration YAML Examples

```
standarizations.yml:
us_phone_number: [
    {
      "key": "id",
      "tbl": "users",
      "col": "phone"
    }
]
src_params.yml
###########################################################
########### srcs Notes ###########################
###########################################################
# srcs comprise of a list of data sources to transform. The data source
should be thought of as a fact table to run field and table level
transformations over.
# Simply add new '- data:' list element and configure the src parameters
for the fact table and the transformations.
###########################################################
########### data.src Notes #######################
###########################################################
# src_db: Database of fact table.
# src_tbl: Fact table name.
# snk_db: Database to write transformed table to.
# snk_tbl: Name of new transformed table.
# config: Name of config table. The config table will be created in the
snk_db as config_<src_tbl>.
# transforms: List of transforms to run over the fact table. The transforms
should be in the order in which they will run.
# transform_type: full or inc.
If running in incremental mode, you will need to ensure deduplication is
ran last as opposed to first e.g. [lookup, <field_transform>,
<field_transform>, dedup].
When staging data from source to prod before the transforms are ran on
the data, you will only get the newest addition of data based on the time
field (time_fld).
Transforms can be ran the on the incremental data. The incremental data
will then be stored then you will run the deduplication step last.
The deduplication utility is actually affected by the transform type
(transform_type) and will fork to incremental deduplication.
This will subsequently run deduplication on just the incremental data
and store the incremental data as <data>_inc.
Then, the last step is a reconciliation step that unions the inc data
and 'yesterday's data and runs a deduplication on the union and promotes to
production.
###########################################################
########### Transforms Notes #####################
###########################################################
# All strings referenced in the transformations need to have " " double
single quotes to escape the single quote
# Remember, window functions can be executed as well within the clean
utility. Refer to the example below
Sub Utility ###
A sub process is leveraged to run transformations before ultimately
joining to the fact table (customers).
So, sub processes should always be positioned before the join utility
within the transforms list in src above e.g. transforms: [clean, sub, join,
dedup].
A sub process is simply the same process however just nested to run on
another source to be leveraged in a join.
The snk_tbl in src should be thought of as the name of a CTE within a
query to leverage in a join.
Another sub process can be further nested within the sub process if
needed. However, this should be very rare.
Join Utility ##
To join a sub process output (e.g. stocks_1 above ^) simply include sub_
prefix before the name.
A filter can be applied with the join. If you want to filter the fact
table referenced in src please just include temp_tbl.<field> <operator>
<str/int>.
If you do not need a filter simply leave '' as a placeholder.
As stated above, all strings referenced in the transformations need to
have " " double single quotes to escape the single quote
Filter Utility ##
Filter process to create a where clause at the end of a SQL statement.
If you would like to use multiple filters simply add another element in
the list and add the appropriate operator e.g. and/or in the preceding list.
```

TABLE 10-continued

Configuration YAML Examples

```
The operator will 'stitch' the clauses together. So, the example below
would create where (gender_code = "M" and email like '%.edu%') and
(last_name like '%s%').
You can also just achieve this within one line as well. Just personal
preference.
#***********************************************************
#******************* Config Start ***********************
#***********************************************************
srcs:
- data:
    src:
      src_db: ${client_short_name}_${src}_${env}
      src_tbl: customers
      snk_db: ${client_short_name}_${stg}_${env}
      snk_tbl: customers
      config: customers
      transforms: [dedup, clean, lookup, sub, join, filter, hash]
      transform_type: full
    dedup:
      engine: presto
      dedup_mx_fld: time
      dedup_order: desc
      dedup_partitn: id
    clean:
    - engine: presto
      new: false
      sql_string: >
        lower(trnsfrm_fld)
      flds: [gender, first_name, last_name]
    - engine: presto
      new: true
      sql_string: >
        case when gender = "Female" then "F" else "M" END
      flds: [gender_code]
    - engine: presto
      new: true
      sql_string: >
        row_number( ) over (partition by email order by time)
      flds: [rnk]
    - engine: presto
      new: true
      sql_string: >
        concat(first_name," ",last_name)
      flds: [name]
    sub:
    - data:
        src:
          src_db: ${client_short_name}_${src}_${env}
          src_tbl: stocks
          snk_db: ${client_short_name}_${stg}_${env}
          snk_tbl: stocks_l
          config: customers
          transforms: [clean]
          transform_type: full
        clean:
        - engine: presto
          new: true
          sql_string: >
            lower(stock)
          flds: [l_stock]
    lookup:
    - engine: presto
      lkup_src: stocks
      lkup_src_jn_key_fld: customer_id
      lkup_src_fld: industry
      lkup_fld: id
    join:
    - join_type: inner
      engine: presto
      fact_key: id
      dim_source: sub_stocks_l
      dim_key: id
      dim_flds: [l_stock, customer_id]
      filter: and temp_tbl.email != "cshalloer@hud.gov"
    - join_type: left
      engine: presto
      fact_key: id
      dim_source: td_src_qa.users
```

TABLE 10-continued

Configuration YAML Examples

```
    dim_key: id
    dim_flds: [first_name, last_name]
    filter: ''
  hash:
  - engine: presto
    flds: [first_name, last_name]
  - engine: presto
    flds: [email]
  filter:
  - engine: presto
    operator: and
    clause: gender_code = "M" and email like "%.edu%"
  - engine: presto
    operator: ''
    clause: last_name like "%s%"
#***********************************************
#******************* Config End ********************
#***********************************************
sources.yml:
sources:
  - source_id: mysql_import_1565989409
    src_db: ${client_short_name}_${src}_${env}
    src_tbl: users
    log_db: reporting
    log_tbl: data_ingestion_log
source_profile_config.yml:
# source_database : 'demo_dilyan'
source_tables : ["customers", "stocks"]
profile_result_db : 'data_profiling'
min_max_limit : 5
val_freq_limit : 5
data_threshold : 0.8
sample_size : 25
seed_standard_sftp.yml:
exec:
  exclude_guess_plugins: ['csv']
  guess_plugins: ['csv_all_strings']
in:
  type: sftp
  host: ${secret:sftpHostname}
  port: ${secret:sftpPort}
  # auth_method: Password
  user: ${secret:sftpUsername}
  path_match_pattern: ${path_match_pattern}
  path_prefix: ${path_prefix}
  # password: ${secret:sftpPassword}
  secret_key_file: ${secret:sftpSecretkeyfile}
  user_directory_is_root: true
  timeout: 600
  parser:
    skip_header_lines: 0
    charset: UTF-8
    newline: CRLF
    type: ""
    delimiter: ""
    quote: ""
    trim_if_not_quoted: true
    strip_whitespace: true
    strip_quote: true
out:
  type: td
  apikey: ${secret:apikey}
  endpoint: ${secret:endpoint} # For Example: api.treasuredata.co.jp
  database: ""
  table: ""
  mode: ""
gld_params.yml:
transaction_item_summary:
  - data: transaction_item_summary
    src:
      src_db: ${short_name}_${src}_${env}
      stg_db: ${short_name}_${stg}_${env}
      gld_db: ${short_name}_${gld}_${env}
      src_tbl: pos_trans_item
      dest_tbl: transaction_item_summary
      qry_path: queries/golden/summary.sql #Path to query
      engine: hive #query engine
      qry_path_inc: queries/golden/summary_inc.sql #Path to inc query
```

TABLE 10-continued

Configuration YAML Examples

```
      engine_inc: presto #query engine inc
      delete_needed: "true" #flag too check if a delete is needed
      key: id #key to get distinct records, can be used in inc query if
needed
      transforms: [golden]
      transform_type: inc #or full
database.yml:
client_name: td
client_short_name: td
env: qa
src: src
stg: stg
gld: gld
connector.yml:
ui_connector: true
```

3. Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 4:
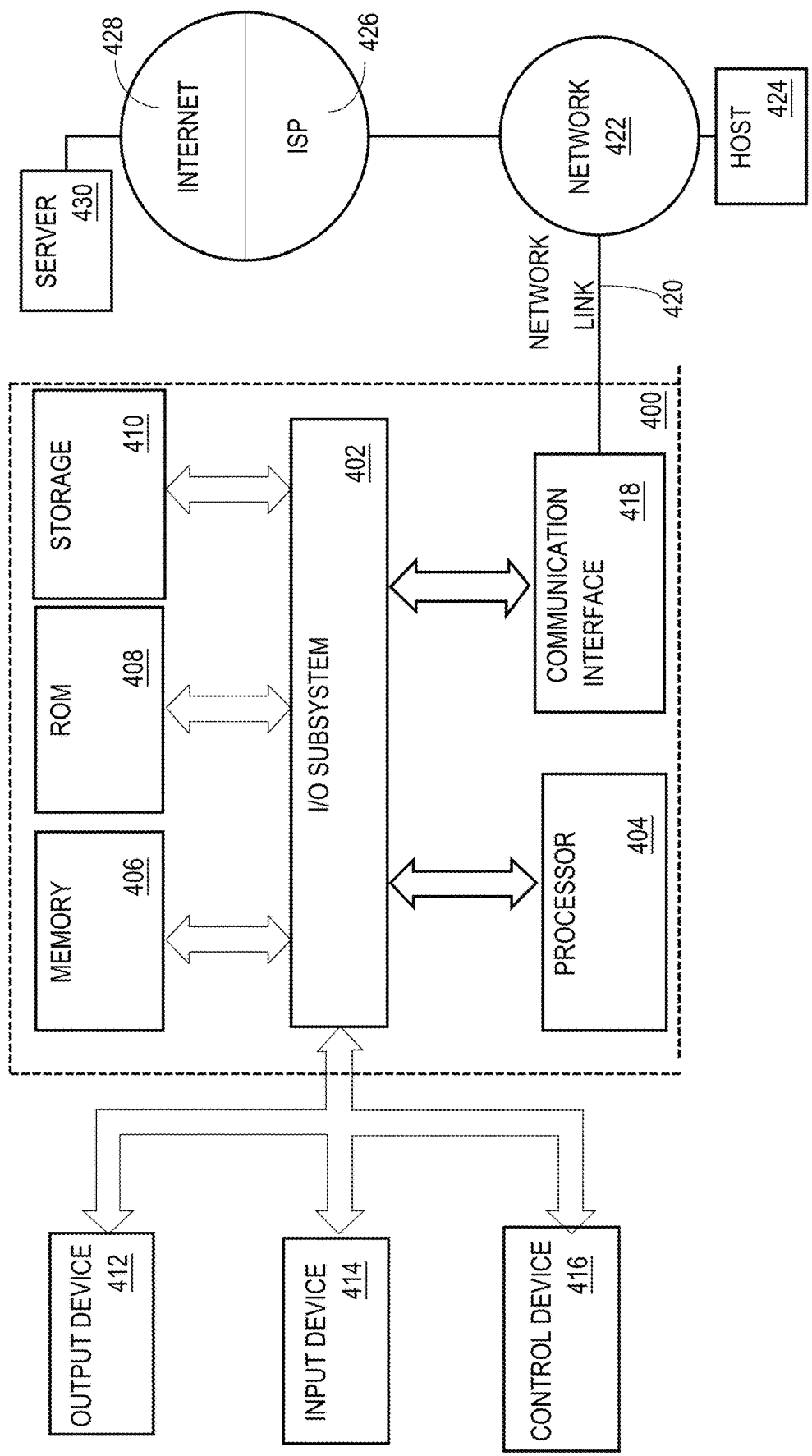
FIG. 4 illustrates a computer system with which one embodiment could be implemented.

FIG. 4 is a block diagram that illustrates an example computer system with which an embodiment may be implemented. In the example of FIG. 4, a computer system 400 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 400 includes an input/output (I/O) subsystem 402 which may include a bus and/or other communication mechanism(s) for communicating information and/or instructions between the components of the computer system 400 over electronic signal paths. The I/O subsystem 402 may include an I/O controller, a memory controller and at least one I/O port. The electronic signal paths are represented schematically in the drawings, for example as lines, unidirectional arrows, or bidirectional arrows.

At least one hardware processor 404 is coupled to I/O subsystem 402 for processing information and instructions. Hardware processor 404 may include, for example, a general-purpose microprocessor or microcontroller and/or a special-purpose microprocessor such as an embedded system or a graphics processing unit (GPU) or a digital signal processor or ARM processor. Processor 404 may comprise an integrated arithmetic logic unit (ALU) or may be coupled to a separate ALU.

Computer system 400 includes one or more units of memory 406, such as a main memory, which is coupled to I/O subsystem 402 for electronically digitally storing data and instructions to be executed by processor 404. Memory 406 may include volatile memory such as various forms of random-access memory (RAM) or other dynamic storage device. Memory 406 also may be used for storing temporary variables or other intermediate information during execution of instructions to be executed by processor 404. Such instructions, when stored in non-transitory computer-readable storage media accessible to processor 404, can render computer system 400 into a special-purpose machine that is customized to perform the operations specified in the instructions.

Computer system 400 further includes non-volatile memory such as read only memory (ROM) 408 or other static storage device coupled to I/O subsystem 402 for storing information and instructions for processor 404. The ROM 408 may include various forms of programmable ROM (PROM) such as erasable PROM (EPROM) or electrically erasable PROM (EEPROM). A unit of persistent storage 410 may include various forms of non-volatile RAM (NVRAM), such as FLASH memory, or solid-state storage, magnetic disk or optical disk such as CD-ROM or DVD-ROM and may be coupled to I/O subsystem 402 for storing information and instructions. Storage 410 is an example of a non-transitory computer-readable medium that may be used to store instructions and data which when executed by the processor 404 cause performing computer-implemented methods to execute the techniques herein.

The instructions in memory 406, ROM 408 or storage 410 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 400 may be coupled via I/O subsystem 402 to at least one output device 412. In one embodiment, output device 412 is a digital computer display. Examples of a display that may be used in various embodiments include a touch screen display or a light-emitting diode (LED) display or a liquid crystal display (LCD) or an e-paper display. Computer system 400 may include other type(s) of output devices 412, alternatively or in addition to a display device. Examples of other output devices 412 include printers, ticket printers, plotters, projectors, sound cards or video cards, speakers, buzzers or piezoelectric devices or other audible devices, lamps or LED or LCD indicators, haptic devices, actuators or servos.

At least one input device 414 is coupled to I/O subsystem 402 for communicating signals, data, command selections or gestures to processor 404. Examples of input devices 414 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (INU) sensors and/or various types of transceivers such as wireless, such as cellular or Wi-Fi, radio frequency (RF) or infrared (IR) transceivers and Global Positioning System (GPS) transceivers.

Another type of input device is a control device 416, which may perform cursor control or other automated control functions such as navigation in a graphical interface on a display screen, alternatively or in addition to input functions. Control device 416 may be a touchpad, a mouse, a trackball, or cursor direction keys for communicating direction information and command selections to processor 404 and for controlling cursor movement on display 412. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 414 may include a combination of multiple different input devices, such as a video camera and a depth sensor.

In another embodiment, computer system 400 may comprise an internet of things (IoT) device in which one or more of the output device 412, input device 414, and control device 416 are omitted. Or, in such an embodiment, the input device 414 may comprise one or more cameras, motion detectors, thermometers, microphones, seismic detectors, other sensors or detectors, measurement devices or encoders and the output device 412 may comprise a special-purpose display such as a single-line LED or LCD display, one or more indicators, a display panel, a meter, a valve, a solenoid, an actuator or a servo.

When computer system 400 is a mobile computing device, input device 414 may comprise a global positioning system (GPS) receiver coupled to a GPS module that is capable of triangulating to a plurality of GPS satellites, determining and generating geo-location or position data such as latitude-longitude values for a geophysical location of the computer system 400. Output device 412 may include hardware, software, firmware and interfaces for generating position reporting packets, notifications, pulse or heartbeat signals, or other recurring data transmissions that specify a position of the computer system 400, alone or in combination with other application-specific data, directed toward host 424 or server 430.

Computer system 400 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 400 in response to processor 404 executing at least one sequence of at least one instruction contained in main memory 406. Such instructions may be read into main memory 406 from another storage medium, such as storage 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 410. Volatile media includes dynamic memory, such as memory 406. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 402. Transmission media can also take the form of acoustic or light waves, such as those generated during radio-wave and infra-red data communications.

Various forms of media may be involved in carrying at least one sequence of at least one instruction to processor 404 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 400 can receive the data on the communication link and convert the data to a format that can be read by computer system 400. For instance, a receiver such as a radio frequency antenna or an infrared detector can receive the data carried in a wireless or optical signal and appropriate circuitry can provide the data to I/O subsystem 402 such as place the data on a bus. I/O subsystem 402 carries the data to memory 406, from which processor 404 retrieves and executes the instructions. The instructions received by memory 406 may optionally be stored on storage 410 either before or after execution by processor 404.

Computer system 400 also includes a communication interface 418 coupled to bus 402. Communication interface 418 provides a two-way data communication coupling to network link(s) 420 that are directly or indirectly connected to at least one communication networks, such as a network 422 or a public or private cloud on the Internet. For example, communication interface 418 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 422 broadly represents a local area network (LAN), wide-area network (WAN), campus network, internetwork or any combination thereof. Communication interface 418 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 418 sends and receives electrical, electromagnetic or optical signals over signal paths that carry digital data streams representing various types of information.

Network link 420 typically provides electrical, electromagnetic, or optical data communication directly or through at least one network to other data devices, using, for example, satellite, cellular, Wi-Fi, or BLUETOOTH technology. For example, network link 420 may provide a connection through a network 422 to a host computer 424.

Furthermore, network link 420 may provide a connection through network 422 or to other computing devices via internetworking devices and/or computers that are operated by an Internet Service Provider (ISP) 426. ISP 426 provides data communication services through a world-wide packet data communication network represented as internet 428. A server computer 430 may be coupled to internet 428. Server 430 broadly represents any computer, data center, virtual machine or virtual computing instance with or without a hypervisor, or computer executing a containerized program system such as DOCKER or KUBERNETES. Server 430 may represent an electronic digital service that is implemented using more than one computer or instance and that is accessed and used by transmitting web services requests, uniform resource locator (URL) strings with parameters in HTTP payloads, API calls, app services calls, or other service calls. Computer system 400 and server 430 may form elements of a distributed computing system that includes other computers, a processing cluster, server farm or other organization of computers that cooperate to perform tasks or execute applications or services. Server 430 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 430 may comprise a web application server that hosts a presentation layer, application layer and data storage layer such as a relational database system using structured query language (SQL) or no SQL, an object store, a graph database, a flat file system or other data storage.

Computer system 400 can send messages and receive data and instructions, including program code, through the network(s), network link 420 and communication interface 418. In the Internet example, a server 430 might transmit a requested code for an application program through Internet 428, ISP 426, local network 422 and communication interface 418. The received code may be executed by processor 404 as it is received, and/or stored in storage 410, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 404. While each processor 404 or core of the processor executes a single task at a time, computer system 400 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
    receiving, from a user computer at a server computer, a
        configuration file specifying one or more data source identifiers of source database tables in a target database system, one or more data sink identifiers of sink database tables in the target database system, and two or more data transformations;

the server computer initiating execution of a data transformation framework by loading one or more configuration parameters of the configuration file into main memory of the server computer to define a workflow;

creating and storing a configuration table based on the configuration file, the configuration table comprising a plurality of dynamic queries, a plurality of identifiers of transformation functions, and names of the two or more data transformations;

in the configuration table, for each of the two or more data transformations, creating plurality of dynamic common table expression queries, each of the dynamic common table expression queries being associated with a particular transformation function matching one of the plurality of identifiers of the transformation functions;

based on the configuration table, serially executing the dynamic common table expression queries to serially execute the two or more data transformations of the source database tables to the sink database tables.

2. The method of claim 1, each transformation among the two or more data transformations comprising one of deduplication, cleaning, standardization, lookup, join, sub procedure, filter, hashing, parsing, matrix operations, pivoting, or transposition.

3. The method of claim 1, further comprising deleting one or more intermediate tables and/or staging tables that have been created as a result of executing the dynamic common table expression queries.

4. The method of claim 1, the configuration file specifying, for each of the two or more data transformations, a data processing engine, and a plurality of operating parameters specific to the data processing engine; the method further comprising executing the dynamic common table expression queries in part by invoking each data processing engine specified in the configuration file using the plurality of operating parameters specific to the data processing engine.

5. The method of claim 1, the configuration file specifying, for one or more of the two or more data transformations, a specification of a nested sub process prior to a join transform, each sub process specifying one or more second data source identifiers of second source database tables in the target database system, one or more second data sink identifiers of second sink database tables in the target database system, and two or more second data transformations; the method further comprising executing the dynamic common table expression queries in part by first executing the two or more second data transformations specified in the sub process followed by a join of one of the second sink tables.

6. The method of claim 5, the configuration file specifying at least one join transform that references, as a dimensional source table, one of the second sink tables of the nested sub process.

7. The method of claim 1, the plurality of dynamic common table expression queries comprising at least one HIVE query and at least one PRESTO query.

8. The method of claim 1, further comprising initiating execution of the data transformation framework by invoking a DIGDAG orchestration file that specifies including a database configuration, including a specification of source parameters, and establishes parallel execution of processing of each of the data source identifiers, the parallel execution comprising, for each of the source database tables, executing a staging query, building a plurality of transforms based on the two or more data transformations including nesting one or more sub processes, and running the plurality of transforms.

9. A computer system comprising:
one or more processors;
one or more non-transitory computer-readable data storage media communicatively coupled to the one or more processors and storing one or more sequences of stored program instructions which, when executed using the one or more processors, cause the one or more processors to execute:

receiving, from a user computer at a server computer, a configuration file specifying one or more data source identifiers of source database tables in a target database system, one or more data sink identifiers of sink database tables in the target database system, and two or more data transformations;

the server computer initiating execution of a data transformation framework by loading one or more configuration parameters of the configuration file into main memory of the server computer to define a workflow;

creating and storing a configuration table based on the configuration file, the configuration table comprising a plurality of dynamic queries, a plurality of identifiers of transformation functions, and names of the two or more data transformations;

in the configuration table, for each of the two or more data transformations, creating a plurality of dynamic common table expression queries, each of the dynamic common table expression queries being associated with a particular transformation function matching one of the plurality of identifiers of the transformation functions;

based on the configuration table, serially executing the dynamic common table expression queries to serially execute the two or more data transformations of the source database tables to the sink database tables.

10. The computer system of claim 9, each transformation among the two or more data transformations comprising one of deduplication, cleaning, standardization, lookup, join, sub procedure, filter, hashing, parsing, matrix operations, pivoting, or transposition.

11. The computer system of claim 9, further comprising sequences of stored program instructions which, when executed using the one or more processors, cause the one or more processors to execute deleting one or more intermediate tables and/or staging tables that have been created as a result of executing the dynamic common table expression queries.

12. The computer system of claim 9, the configuration file specifying, for each of the two or more data transformations, a data processing engine, and a plurality of operating parameters specific to the data processing engine;

the system further comprising sequences of stored program instructions which, when executed using the one or more processors, cause the one or more processors to execute the dynamic common table expression queries in part by invoking each data processing engine specified in the configuration file using the plurality of operating parameters specific to the data processing engine.

13. The computer system of claim 9, the configuration file specifying, for one or more of the two or more data transformations, a specification of a nested sub process prior to a join transform, each sub process specifying one or more second data source identifiers of second source database tables in the target database system, one or more second data sink identifiers of second sink database tables in the target database system, and two or more second data transformations;

the system further comprising sequences of stored program instructions which, when executed using the one or more processors, cause the one or more processors to execute the dynamic common table expression queries in part by first executing the two or more second data transformations specified in the sub process followed by a join of one of the second sink tables.

14. The computer system of claim 13, the configuration file specifying at least one join transform that references, as a dimensional source table, one of the second sink tables of the nested sub process.

15. The computer system of claim 9, the plurality of dynamic common table expression queries comprising at least one HIVE query and at least one PRESTO query.

16. The computer system of claim 9, further comprising sequences of stored program instructions which, when executed using the one or more processors, cause the one or more processors to initiate execution of the data transformation framework by invoking a DIGDAG orchestration file that specifies including a database configuration, including a specification of source parameters, and establishes parallel execution of processing of each of the data source identifiers, the parallel execution comprising, for each of the source database tables, executing a staging query, building a plurality of transforms based on the two or more data transformations including nesting one or more sub processes, and running the plurality of transforms.

17. One or more non-transitory computer-readable data storage media communicatively coupled to one or more processors and storing one or more sequences of stored program instructions which, when executed using the one or more processors, cause the one or more processors to execute:

receiving, from a user computer at a server computer, a configuration file specifying one or more data source identifiers of source database tables in a target database system, one or more data sink identifiers of sink database tables in the target database system, and two or more data transformations;

the server computer initiating execution of a data transformation framework by loading one or more configuration parameters of the configuration file into main memory of the server computer to define a workflow;

creating and storing a configuration table based on the configuration file, the configuration table comprising a plurality of dynamic queries, a plurality of identifiers of transformation functions, and names of the two or more data transformations;

in the configuration table, for each of the two or more data transformations, creating a plurality of dynamic common table expression queries, each of the dynamic common table expression queries being associated with a particular transformation function matching one of the plurality of identifiers of the transformation functions;

based on the configuration table, serially executing the dynamic common table expression queries to serially execute the two or more data transformations of the source database tables to the sink database tables.

18. The media of claim 17, each transformation among the two or more data transformations comprising one of deduplication, cleaning, standardization, lookup, join, sub procedure, filter, hashing, parsing, matrix operations, pivoting, or transposition.

19. The media of claim 17, further comprising sequences of stored program instructions which, when executed using the one or more processors, cause the one or more processors to execute deleting one or more intermediate tables and/or staging tables that have been created as a result of executing the dynamic common table expression queries.

20. The media of claim 17, the configuration file specifying, for each of the two or more data transformations, a data processing engine, and a plurality of operating parameters specific to the data processing engine;

the media further comprising sequences of stored program instructions which, when executed using the one or more processors, cause the one or more processors to execute the dynamic common table expression queries in part by invoking each data processing engine specified in the configuration file using the plurality of operating parameters specific to the data processing engine.

21. The media of claim 17, the configuration file specifying, for one or more of the two or more data transformations, a specification of a nested sub process prior to a join transform, each sub process specifying one or more second data source identifiers of second source database tables in the target database system, one or more second data sink identifiers of second sink database tables in the target database system, and two or more second data transformations;

the media further comprising sequences of stored program instructions which, when executed using the one or more processors, cause the one or more processors to execute the dynamic common table expression queries in part by first executing the two or more second data transformations specified in the sub process followed by a join of one of the second sink tables.

22. The media of claim 21, the configuration file specifying at least one join transform that references, as a dimensional source table, one of the second sink tables of the nested sub process.

23. The media of claim 17, the plurality of dynamic common table expression queries comprising at least one HIVE query and at least one PRESTO query.

24. The media of claim 17, further comprising sequences of stored program instructions which, when executed using the one or more processors, cause the one or more processors to initiate execution of the data transformation framework by invoking a DIGDAG orchestration file that specifies including a database configuration, including a specification of source parameters, and establishes parallel execution of processing of each of the data source identifiers, the parallel execution comprising, for each of the source database tables, executing a staging query, building a plurality of transforms based on the two or more data transformations including nesting one or more sub processes, and running the plurality of transforms.

* * * * *